Patented May 26, 1936

2,042,225

UNITED STATES PATENT OFFICE 2,042,225

CONVERSION OF HALOGENATED ALCOHOLS TO CARBONYLIC COMPOUNDS

Herbert P. A. Groll, Oakland, and Carl T. Kautter, Berkeley, Calif., assignors to Shell Development Company, San Francisco, Calif., a corporation of Delaware No Drawing. Application July 3, 1934, Serial No. 733,634

17 Claims. (Cl. 260—138)

This invention relates to a novel process for the conversion of halogenated alcohols to valuable carbonylic compounds which comprises treating a halogenated alcohol with water under acid conditions preferably at an elevated temperature and under superatmospheric pressure.

Our invention provides a simple, economical and broadly applicable method for the production of many useful saturated as well as unsaturated carbonylic compounds. We are particularly interested in the application of our method to the treatment of halogenated alcohols wherein the sum of the halogen atoms and hydroxyl groups is equal to at least three. Halogenated alcohols of this type may be converted in excellent yields to valuable and hitherto difficultly obtainable unsaturated aldehydic and ketonic compounds. The unsaturated aldehydes of the class consisting of acrolein and its homologues, analogues and substitution products may be readily prepared in the presence of water and without resorting to the use of costly dehydrating agents.

Another object of the present invention is to provide a process whereby saturated monohalogenated monohydric alcohols may be readily converted to saturated carbonylic compounds. By our method we may prepare saturated carbonylic compounds in excellent yields from halohydrins which have hitherto failed to yield carbonylic compounds, or have yielded the same in amounts too small to economically warrant their treatment. Our method is also applicable to the treatment of relatively stable aliphatic, non-cyclic halohydrins containing only one halogen atom and only one hydroxyl group, wherein both are linked to separate carbon atoms which may or may not be vicinal; it is applicable with those relatively stable aliphatic, non-cyclic monohalogenated-monohydric alcohols wherein the halogen atom is linked to a primary, secondary or tertiary carbon atom which is not vicinal to the carbinol group regardless of the character of said carbinol group, i. e. whether the carbinol group is of primary, secondary or tertiary character. Our process can be executed efficiently and practically with those aliphatic, non-cyclic- monohalogen-monohydrins wherein the halogen atom is linked to a primary carbon atom which is vicinal to a carbinol group provided the conversion end-product is removed from the sphere of reaction substantially as soon as it or they is or are formed therein. Included within the last mode of treatment are the unsaturated halohydrins regardless of the character of the carbon atoms to which halogen atoms and hydroxyl groups are attached.

It is known that halohydrins such as

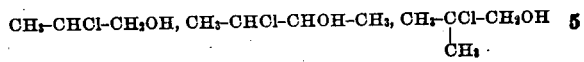

and the like wherein the halogenated carbon atom is of secondary or tertiary character and vicinal to a carbinol group are readily converted to saturated carbonylic compounds by mere distillation with water. However, a study of the prior art fails to reveal a practical method for the production of carbonylic compounds from halohydrins wherein the halogenated carbon atom and carbinol group are not vicinal, or from halohydrins wherein a halogenated primary carbon atom is vicinal to the carbinol group.

The investigators, Michael and Leighton (Berichte 39 pages 2789–2795 (1906) studied the preparation of isobutyraldehyde from isobutylene chlor-hydrins. Their results indicate that β-isobutylene chlorhydrin

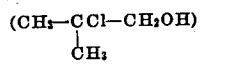

is readily converted to isobutyraldehyde by simply refluxing it with water, while the isomeric α-isobutylene chlorhydrin

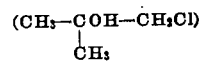

is quite stable under the same conditions. Prolonged refluxing of the latter compound with water yielded only very small amounts of isobutyraldehyde. The yield of aldehyde was much too small to warrant any technical consideration of this method . Michael and Leighton reported that after 14 hours of refluxing with water, 56% of the treated α-isobutylene chlorhydrin was converted to isobutyraldehyde. It is evident that this result does not represent a true conversion value for α-isobutyraldehyde, since the same investigators later made the statement that instead of pure α-isobutylene chlorhydrin they were actually treating a mixture of 80% α-isobuty..ne chlorhydrin and 20% β-isobutylene chlorhydrin. This equilibrium mixture of the isomeric chlorhydrins results when isobutylene is reacted with HOCl.

We have repeated the experiments of Michael and Leighton employing pure α-isobutylene chlorhydrin prepared by reacting isobutenyl chloride with $H_2SO_4$ and hydrolyzing the resulting halogenated alkyl sulphate. Only traces of isobutyraldehyde were formed.

Now we have found a practical and economical process for the preparation of carbonylic compounds from halohydrins such as α-isobutylene chlorhydrin wherein a halogenated primary carbon atom is vicinal to a carbinol group.

The contemplated halogenated alcohols may be of aliphatic, aralkyl or alicyclic character and saturated as well as suitable unsaturated halogenated alcohols may be treated. The carbinol group or groups contained therein may be of primary, secondary, tertiary or mixed character. We prefer to employ those compounds containing a monohalogenated carbon atom or atoms.

A preferred list of halogenated alcohols particularly adaptable to treatment by our method includes compounds such as

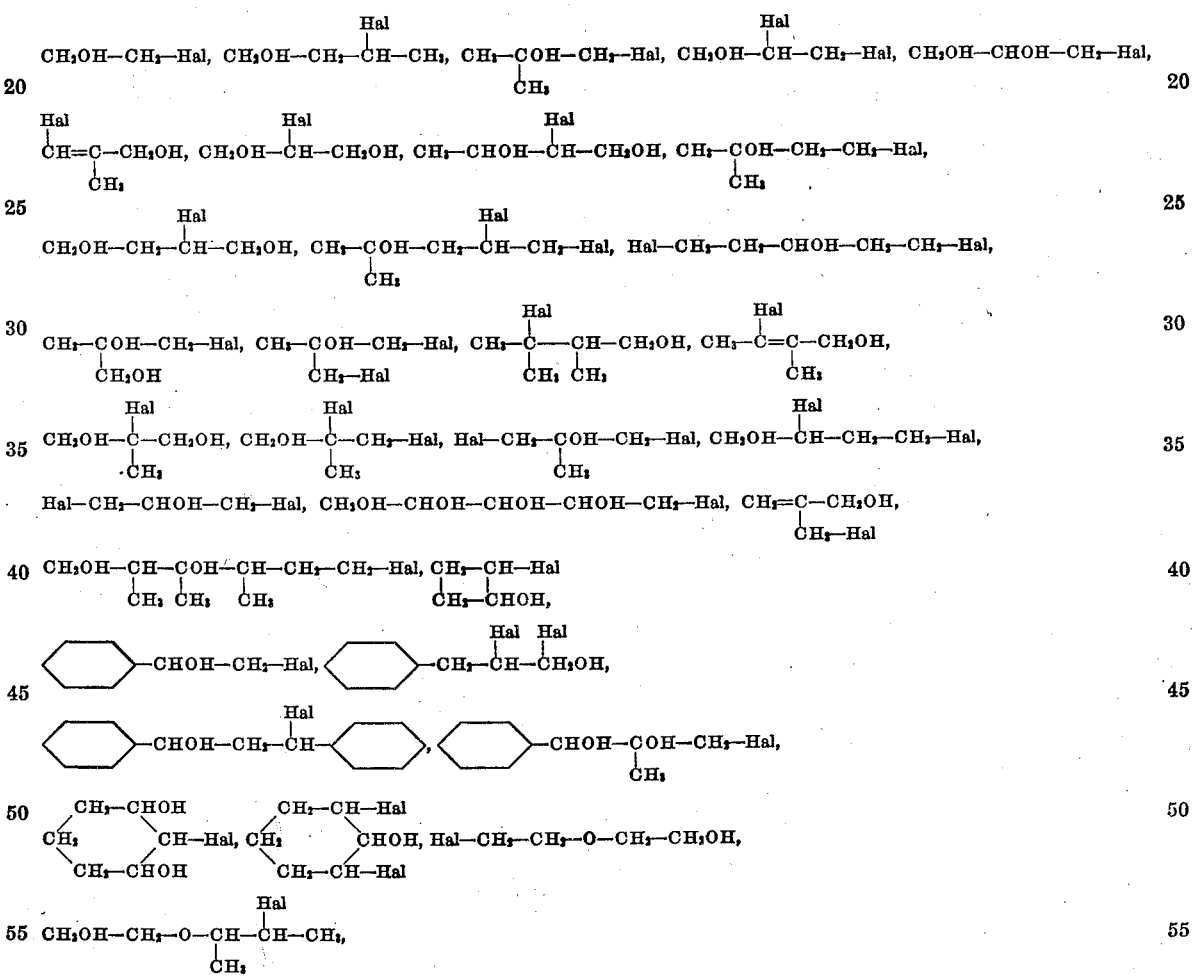

and the like and their homologues, analogues and substitution products.

It is to be understood that, in the halogenated alcohols, treated, the hydrogen atoms other than those included in hydroxyl groups may be substituted by alkyl, alkoxy, aralkyl, aralkoxy, carbocyclic, heterocylic and/or aryloxy groups which may or may not be further substituted as well as by any suitable organic radical or monovalent substituent.

Our method is also applicable to the treatment of those halogenated alcohols wherein one or a plurality of carbinol groups has or have been esterified or etherified. The compound may also be a halogenated mixed ether and ester derived from a halogenated alcohol. Under the conditions of execution of our invention, such ethers and/or esters are split at the ethereal or ester bond or bonds resulting in the formation of an alcohol which alcohol is rearranged to a carbonylic compound. We do not contemplate the treatment of compounds such as

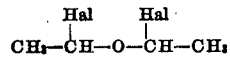

wherein the alcohol from which the ether or ester would be derived is of the unstable vinyl type.

In most cases when the halogenated alcohol treated posseses a primary carbinol group or halogenated primary carbon atom which is involved in the reaction, the reaction product is aldehydic. However, in some cases in which a primary carbinol group or halogenated primary carbon atom is involved, ketones are formed through a reaction mechanism which is not quite understood. The reaction product in these cases is a mixture of aldehyde and ketone which usually contains a larger amount of ketone than aldehyde. For example, the isoamylene chlorhydrin of the formula

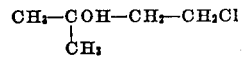

when treated by our method yielded a mixture of 72.4% methyl isopropyl ketone and only 27.6% of the expected aldehyde.

When only secondary and/or tertiary carbinol groups are involved in the reaction, the product is usually ketonic in character. However, in some cases, mixtures of aldehydes and ketones are obtained.

If the halogenated alcohol treated is unsaturated and possesses a halogen atom linked to a carbon atom in a gamma position to the carbinol group, the resulting product is an unsaturated carbonylic compound. For example, when the γ-chlorisobutenol of the formula

is treated by our method, the halogenated alcohol is not directly rearranged to chlorisobutyraldehyde, but instead, hydrogen chloride is split off whereby methyl acrolein is obtained in accordance with the reaction:

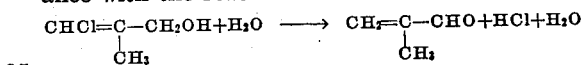

We have observed that the method of the present invention is particularly applicable to the treatment of halogenated alcohols possessing a tertiary carbinol group. Such compounds are in general converted to the corresponding carbonylic compounds more readily and in better yields than those halogenated alcohols containing only primary and/or secondary carbinol groups. When executing our invention with halogenated alcohols wherein the sum of the halogen atoms is at least three, better results are obtained if the treated compound possesses at least on tertiary carbinol group or halogenated tertiary carbon atom. In general, when operating with members of this preferred class of alcohols, lower temperatures and correspondingly lower operating pressures may be employed, although in the great majority of cases, we prefer to employ temperatures above 100° C. and pressures greater than atmospheric. Better yields of carbonylic compounds are usually obtainable from such halogenated alcohols due to the fact that the resulting products are not so readily polymerized on contact with the acidic reaction mixture under the less severe operating conditions which are to a lesser degree conducive to undesirable side reactions.

The present invention comprises treating a halogenated alcohol of the type herein specified in the presence of a relatively large amount of water under acid conditions at a temperature preferably greater than 100° C. and/or a preferably superatmospheric pressure, whereby conversion to the corresponding carbonylic compound is effected. Our invention is preferably executed in a temperature range of from about 150° C to about 250° C. under the pressure existing in the system.

In the great majority of cases, particularly when chlorinated and/or brominated alcohols are treated, the reaction may be conducted under acid conditions without resorting to the application of an acid or acid acting compound. Under the preferred conditions of operation, the halogenated alcohol reacts with water and hydrogen halide is liberated. The liberated hydrogen halide dissolves in the reaction mixture and renders the mixture sufficiently acidic to permit the reaction to proceed rapidly to completion. As the reaction proceeds to completion, the concentration of hydrogen halide in the reaction mixture increases. Since we have found that our invention is best executed in the presence of relatively dilute aqueous acid solutions, we prefer to operate in such a manner that the acid concentration of the reaction mixture may be kept substantially constant at or below some predetermined maximum. This object may be attained in a wide variety of suitable manners. We may continuously or intermittently withdraw a portion of the aqueous solution from the reaction vessel and continuously or intermittently admit water in an amount sufficient to maintain the acid concentration substantially constant. We may neutralize the excess of hydrogen halide as it is formed by the continuous or intermittent introduction of a suitable basic or basic reacting compound. We have found that excellent results may be obtained by conducting the reaction in the presence of a suitable metal carbonate. The alkaline earth metal carbonates are particularly suitable for our purpose. For example, we may effect the conversion in the presence of $CaCO_3$ under a superatmospheric pressure. Although $CaCO_3$ acts as a neutralizing agent for the hydrogen halide the reaction nevertheless proceeds under acidic conditions. The alkaline earth metal carbonates being insoluble in water act as neutralizing agents only as fast as they can be dissolved by the reaction:

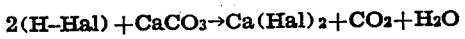

The hydrogen halide is formed by the reaction of the halogenated alcohol with water. The reaction as illustrated by the above equation occurs only on the surface of the $CaCO_3$ powder, hence, the liquid between the solid particles obviously will be acidic due to the hydrogen halide liberated in the hydrolysis reaction. In addition, the liberated $CO_2$, under the pressure in the system, dissolves in the reaction mixture and aids in keeping the system acidic. The mode of procedure may be particularly advantageous when it is desired to operate at lower temperatures under relatively high pressures.

In some cases, it may be desirable to accelerate or initiate the reaction by employing an aqueous solution, mixture or suspension of an acid, an acidic substance, an acid reacting salt, an acid reacting substance or a substance capable of acting as an acid body under the conditions of operation and in contact with the reactants in the reaction medium. Suitable compounds which may be employed include the strong mineral acids such as $H_2SO_4$, $H_3PO_4$, $H_2S_2O_7$, $HPO_4$, $H_3PO_3$, $HCl$, $HBr$, $H_4P_2O_7$, $HClO_3$, $HNO_3$ and the like or we may apply substances which form acids on contact with water such as $SO_2Cl_2$, $SOCl_2$, $SOBr_2$, $NO_2$, $CO_2$, $N_2O_3$, $NOCl$, $POCl_3$, $PCl_3$, $PCl_5$, $PBr_3$ and the like. We may employ suitable inorganic acid acting salts such as $ZnSO_4$, $ZnCl_2$, $ZnBr_2$, $FeCl_3$, $FeBr_3$, $AlCl_3$, $CoCl_2$, $NiCl_2$, $Fe_2(SO_4)_3$, $Al_2(SO_4)_3$, $NaHSO_4$, $NaH_2PO_4$ and the like compounds. In addition we may employ organic salts and compounds capable of acting as mineral acids under the conditions of operation such as benzene sulphonic acid and its homologues and analogues, dialkyl and alkyl acid sulphates, alkylated phosphoric and sulphonic acids, halogenated organic acids, acids such as sulpho-acetic, etc., acid halides and compounds such as aniline hydrochloride and the like.

In general, the conversion power of the acid acting body employed is dependent on its acid strength in aqueous solution and upon the temperature of execution of the process. The weaker the acidity of the acid acting body, the lower is its catalytic activity at any given temperature. Accordingly, other conditions being the same, the use of a weaker acid acting body ordinarily requires its application in higher concentrations or necessitates the use of higher operating temperatures in order to obtain the same degree of activity. In the majority of cases when we resort to the use of a strong acid, we prefer to use sulphuric acid in solutions possessing a concentration of from about 3% to about 20%. The other mineral acids may be used in corresponding concentrations depending on the acid strength of the acid employed. Higher acid concentrations may be used when it is desirable to accelerate the reaction in the preferred temperature range, but ordinarily, when the acid is employed in concentrations exceeding 20% calculated as percent $H_2SO_4$, there is a material decrease in yield of the desired carbonylic compound due to the formation of tar and the like polymerization and condensation products.

In some instances it may be desirable to execute our invention by effecting the conversion of certain halogenated alcohols by reacting the halogenated alcohol with water in the presence of a suitable organic solvent for the catalyst initially applied or generated as the reaction proceeds. The use of such a solvent may be particularly advantageous in those cases where a more homogeneous reaction mixture will result due to the relatively greater solubility of some halogenated alcohols in certain water-organic solvent solutions than in water. In some cases, the organic solvent applied may aid the rapid removal of the reaction product from the reaction mixture by formation of an azeotropic mixture comprising the product, the solvent and water. Any suitable solvent that is inert to the reaction product or products may be used. We prefer to employ the lower liquid organic acids, particularly those possessing a relatively low viscosity, in those cases wherein our invention is not executed in the presence of a neutralizing agent for the hydrogen halide liberated. Suitable organic acid solvents include acetic, propionic, butyric, isobutyric and the like.

Our invention may be executed in any suitable apparatus wherein the reactions may be controlled and the halogenated alcohol treated substantially in the manner as herein described. In a preferred mode of operation, we contact the halogenated alcohol with water and/or an aqueous solution, mixture or suspension of an acid acting substance in a pressure reaction vessel equipped with means for effecting agitation of the contacting reactants. The order of introduction of the reactants may be varied and when an acid acting catalyst is initially applied, said catalyst may be admitted to the reaction vessel before, after or during the admission of the reactants. In general, the catalyst is admitted as a dilute aqueous solution. We prefer to operate with the dilute aqueous solution in substantial excess over the halogenated alcohol in the reaction mixture, hence we may advantageously introduce the halogenated alcohol intermittently or continuously to the heated water or aqueous solution, mixture or suspension of the acid acting compound.

The reaction products formed by our method are in many cases readily polymerized and otherwise undesirably affected on prolonged contact with the acid reaction mixture at the desired conditions of temperature and pressure. We may avoid these undesirable side reactions by executing our invention in such a manner that carbonylic compounds are removed from the reaction mixture substantially as soon as they are formed. This object may be achieved in a wide variety of suitable manners. In a preferred mode of execution of our process we effect rapid removal of the reaction product by distilling the reaction product from the reaction mixture at such a rate that the substantial accumulation of the former in the system is prevented. This preferred method is applicable in the majority of cases, since the boiling temperature of the reaction product or its azeotropic mixture with water and/or other constituents of the reaction mixture is usually lower than the boiling temperature of the reaction mixture. The reaction product may be distilled under pressure from the reaction vessel at any desired rate.

When the halohydrins of glycerol and its homologues and substitution products are converted by our preferred mode of operation, the main reaction product is an unsaturated, readily polymerizable carbonylic compound. In this case, it is desirable that the reaction product be distilled from the system in the presence of a relatively great excess of water. In this manner the occurrence of undesirable side reactions is substantially obviated. In order to maintain the acid concentration and volume of water in the system substantially constant, we may intermittently or continuously admit an amount of water to the reaction vessel which is equivalent in volume to that removed by distillation with the reaction product.

The halogenated alcohol may be admitted to the reaction vessel in the anhydrous state, or aqueous solutions, mixtures or suspensions of one or more species of halogenated alcohols may be advantageously employed without resorting to separation of the constituents.

The carbonylic compounds are readily recovered by condensing the vapors removed from the reaction vessel. The condensate, which usually comprises the reaction product and varying amounts of water and other constituents of the reaction mixture, may be used as condensed for certain purposes such as solvents, intermediates and the like or the reaction product or products may be separated therefrom by any suitable means or combination of means such as stratification, extraction, distillation, use of drying agents, etc. Any unreacted halogenated alcohol which may be recovered from the condensate may be conducted back to the reaction vessel for reutilization therein.

The following examples are introduced for the purpose of illustrating the mode of procedure and indicating the type of carbonylic compound obtained when specific halogenated alcohols are reacted in accordance with the principles of our invention. It is to be understood that these examples are intended for purposes of illustration only and that we do not thereby limit our invention.

*Example I*

62.2 gm. (0.5 mols) of methyl glycerine monochlorhydrin

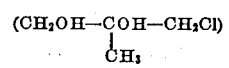

were mixed with about 400 c. c. of 12% $H_2SO_4$ and the mixture was charged to the kettle of a pressure still and heated to 170° C. under the existing pressure.

The distillate, which consisted of the reaction product and an excess of water was removed from the stillhead at a rate sufficiently high to prevent the accumulation of the reaction product in the reaction vessel.

The condensed distillate was allowed to stratify, the liquid phases separated and the non-aqueous phase was dried and fractionated.

The reaction product was methyl acrolein

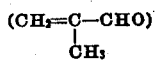

This product was obtained in a yield of about 75% of the theoretical.

Example II 189 gm. (2.0 mols) of propylene chlorhydrin, 110 gm. (1.1 mols) of $CaCO_3$ and about 2 liters of water were placed in an autoclave and the mixture was stirred and heated at about 200° C. for a period of about one hour. The reaction product was then fractionated at atmospheric pressure.

The reaction mixture contained 81.0 gm. of propionaldehyde, 18.5 gm. of acetone, 15 gm. of a water insoluble liquid containing methyl ethyl acrolein and about 5.0 gm. of propylene glycol.

Example III 217 gm. (2.0 mols) of α-isobutylene chlorhydrin, 110 gm. (1.1 mols) of $CaCO_3$ and two liters of water were stirred and heated in an autoclave at about 200° C. for about one hour.

The product was then distilled from the reaction mixture. 123 gm. (1.71 mols) of isobutyraldehyde and 15 gm. of a higher boiling compound which was probably the isobutyraldehyde acetal of α-isobutylene chlorhydrin were obtained.

Isobutyraldehyde was obtained in a yield of 85.5% of the theoretical.

Example IV 94.5 gm. (1.0 mols) of 1-bromo-butanol-2 ($CH_2Br-CH_2-CH_2-CH_2OH$) were mixed with about 800 c. c. of a 12% $H_2SO_4$ solution and the mixture was charged to the kettle of a pressure still. The reaction product was distilled under pressure from the system with the reaction mixture at a temperature of about 175° C.

The distillate which consisted of the reaction product and an excess of water was distilled from the system at a rate prohibitive to the accumulation of the reaction product in the system.

The condensed distillate was allowed to stratify. The liquid phases were separated and the non-aqueous phase was dried and fractionated.

Butyraldehyde was obtained in a yield of 90%.

Example V

A mixture of 56.5 gm. (0.5 mols) of glycerine dichlorhydrin, 52.5 gm. (0.525 mols) of $CaCO_3$ and 160 gm. of water was placed in a pressure bomb and agitated and heated at 155° C. for about 2.0 hours.

When the operation was terminated, the cooled reaction mixture was filtered and the unreacted $CaCO_3$ separated. The filtrate was fractionated.

The main reaction product was acrolein.

Example VI 250 gm. of dibromo tertiary butyl alcohol

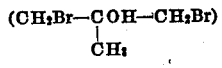

were added to 2000 c. c. of water in an acid resisting autoclave equipped with a fractionating column. The contents of the autoclave were stirred and heated to 180° C. The resulting methyl acrolein was fractionated from the autoclave substantially as soon as it was formed. 105 gm. of methyl acrolein were found in the condensed distillate.

The methyl acrolein was obtained in a yield of 86%.

Example VII 217 gm. (2.0 mols) of α-isobutylene chlorhydrin

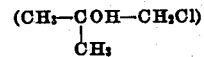

were mixed with about 3600 c. c. of water and the mixture was charged to the kettle of a pressure distillation apparatus. This mixture was heated at about 150° C. with the system under a pressure of about 75 pounds per sq. in. (gauge). The reflux ratio of the column was adjusted by means of a suitable reduction valve until the product, with water vapors, was distilled from the system substantially as soon as it was formed therein. The distillation was continued until no more aldehyde could be detected in the distillate.

The condensed distillate was allowed to stratify and the two liquid layers were separated. The non-aqueous layer was dried and fractionated.

The main reaction product was isobutyraldehyde

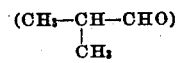

which was obtained in a yield of 90%.

Example VIII 94.5 gm. (1.0 mol) of glycerine monochlorhydrin ($CH_2OH-CHOH-CH_2Cl$) were mixed with about 800 c. c. of a 12% $H_2SO_4$ solution. This mixture was charged to the kettle of a pressure still and heated to about 225° C. under the pressure existing in the closed system.

The reaction product and a large excess of water were distilled from the system at a rate sufficiently high to prevent accumulation of the reaction product in the system. The distillation was continued until the reaction was complete.

The condensed distillate was allowed to stratify and the non-aqueous layer was separated, dried and fractionated.

Acrolein was obtained in a yield of 65%.

It will be apparent that our invention may be executed in a batch, intermittent or continuous manner. The halogenated alcohol and water may be intermittently or continuously introduced into the reaction vessel, independently or in mixture, solution or suspension with each other. The reaction product per se or in a mixture with water and/or other constituents of the reaction mixture may be continuously distilled from the reaction mixture. The distillate may be condensed and conducted to a communicating apparatus wherein it may be rectified and the product obtained in the desired degree of purity. Other than distillation means may be resorted to for effecting rapid removal of the carbonylic compound from the acidic reaction mixture.

When an acid acting body is applied, said compound may be mixed with or dissolved in the water or other solvent employed before, during or after the introduction of the solvent to the reaction vessel.

The carbonylic compounds obtained by our method may be used for a variety of solvent and extraction purposes, or they may be used as intermediates in the preparation of many useful organic compounds. For example, they may be oxidized to the corresponding carboxylic acids or they may be used to introduce alkyl or alkenyl groups into organic compounds by condensation or by the use of metallo organo derivatives. The unsaturated aldehydes and ketones may be oxidized to the corresponding unsaturated acids and have varied uses in pharmaceutical chemistry. The carbonylic compounds may be converted to valuable resins and condensation products. They may be used as resin forming bodies per se or they may be condensed with any of the well-known condensing agents.

While we have in the foregoing described in some detail the preferred embodiments of our invention and some variants thereof, it will be understood that this is only for the purpose of making the invention more clear and that the invention is not to be regarded as limited to the details of operation herein described nor is it dependent upon the soundness or accuracy of the theories which we have advanced as to the reasons for the advantageous results attained. On the other hand, the invention is to be regarded as limited only by the terms of the accompanying claims, in which it is our intention to claim all novelty inherent therein as broadly as possible in view of the prior art.

We claim as our invention:

1. A process for the conversion of halogenated alcohols to valuable carbonylic compounds which comprises heating a halogenated alcohol with water at a temperature above 100° C. and removing the carbonylic end-product substantially as soon as formed.

2. A process for the conversion of halogenated alcohols to valuable carbonylic compounds which comprises heating a halogenated alcohol with water at a superatmospheric pressure, and removing the carbonylic end-product by distillation substantially as soon as formed.

3. A process for the conversion of halogenated alcohols to valuable carbonylic compounds which comprises heating a halogenated alcohol wherein the sum of the halogen atoms and hydroxyl groups is equal to at least three, with water and removing the carbonylic end-product by distillation substantially as soon as formed.

4. A process for the conversion of halogenated alcohols to valuable carbonylic compounds which comprises heating a monohalogenated monohydric alcohol wherein the halogenated carbon atom is vicinal to the carbinol group, with water and at a superatmospheric pressure, and removing the carbonylic end-product substantially as soon as formed by distillation.

5. A process for the conversion of halogenated alcohols to valuable carbonylic compounds which comprises heating a monohalogenated monohydric alcohol wherein the halogenated carbon atom and carbinol group are not vicinal, with water and removing the carbonylic end-product by distillation substantially as soon as formed.

6. A process for the conversion of halogenated alcohols to valuable carbonylic compounds which comprises heating a monohalogenated monohydric alcohol wherein the halogenated carbon atom and carbinol group are not vicinal, with water under acid conditions and at a superatmospheric pressure and removing the carbonylic end-product by distillation substantially as soon as formed.

7. A process for the conversion of halogenated alcohols to valuable carbonylic compounds which comprises heating a halogenated alcohol with water and an extraneous acid acting compound and removing the carbonylic end-product by distillation substantially as soon as formed.

8. A process for the conversion of halogenated alcohols to valuable carbonylic compounds which comprises heating a halogenated alcohol with water under maintained acid conditions while employing a quantity of a neutralizing agent to control the acidity of the reaction system.

9. A process for the conversion of halogenated alcohols to valuable carbonylic compounds which comprises heating a halogenated alcohol with water under maintained acid conditions while employing a quantity of a metal carbonate to control the acidity of the reaction system.

10. A process for the conversion of halogenated alcohols to valuable carbonylic compounds which comprises heating a halogenated alcohol with water under maintained acid conditions while employing a quantity of an alkaline earth metal carbonate to control the acidity of the reaction system.

11. A process for the conversion of halogenated alcohols to valuable carbonylic compounds which comprises heating a halogenated alcohol with water under maintained acid conditions while employing a quantity of $CaCO_3$ to control the acidity of the reaction system.

12. A process for the conversion of halogenated alcohols to valuable carbonylic compounds which comprises heating a halogenated alcohol wherein the sum of the halogen atoms and hydroxyl groups is equal to at least three, and wherein three thereof are linked to vicinal carbon atoms, with water in the presence of an extraneous acid acting compound and removing the carbonylic end-product by distillation substantially as soon as formed.

13. A process for the conversion of halogenated alcohols to valuable carbonylic compounds which comprises heating a halogenated alcohol with water and an extraneous acid acting compound at a superatmospheric pressure, and removing the resulting carbonylic end-product by distillation substantially as soon as formed.

14. A process for the conversion of halogenated alcohols to valuable carbonylic compounds which comprises heating a halogenated alcohol wherein at least one carbinol group is linked through its oxygen atom to a carbon atom of a hydrocarbon radical with water in the presence of an acid acting compound and removing the carbonylic end-product by distillation substantially as soon as formed.

15. A process for the production of isobutyraldehyde which comprises heating $\alpha$-isobutylene chlorhydrin at a temperature above 100° C. and at a superatmospheric pressure, and removing the resulting isobutyraldehyde substantially as soon as formed.

16. A process for the production of an unsaturated carbonylic compound which comprises heating a glycerine halohydrin with water and removing the carbonylic end-product by distillation substantially as soon as formed.

17. A process for the production of an unsaturated carbonylic compound which comprises heating a halogenated alcohol containing three vicinal carbinol groups with water and removing the carbonylic end-product by distillation substantially as soon as formed.

HERBERT P. A. GROLL.
CARL T. KAUTTER.